US008965833B2

(12) United States Patent
Waldock et al.

(10) Patent No.: US 8,965,833 B2
(45) Date of Patent: Feb. 24, 2015

(54) GENERATING A SET OF SOLUTIONS TO A MULTI-OBJECTIVE PROBLEM

(75) Inventors: Antony James Waldock, Bristol (GB); David Wolfe Corne, Edinburge Lothian (GB)

(73) Assignee: BAE SYSTEMS plc, London (GB)

( * ) Notice: Subject to any disclaimer, the term of this patent is extended or adjusted under 35 U.S.C. 154(b) by 335 days.

(21) Appl. No.: 13/508,211

(22) PCT Filed: Nov. 5, 2010

(86) PCT No.: PCT/GB2010/051847
§ 371 (c)(1),
(2), (4) Date: May 4, 2012

(87) PCT Pub. No.: WO2011/055145
PCT Pub. Date: May 12, 2011

(65) Prior Publication Data
US 2012/0226654 A1      Sep. 6, 2012

(51) Int. Cl.
*G06N 5/02*      (2006.01)
*G06F 17/11*     (2006.01)
*G01C 21/34*     (2006.01)

(52) U.S. Cl.
CPC ............ *G06F 17/11* (2013.01); *G01C 21/3446* (2013.01)
USPC .......................................................... 706/52

(58) Field of Classification Search
CPC ....... G06N 5/02; G06F 17/11; G01C 21/3446
USPC .......................................................... 706/52
See application file for complete search history.

(56) References Cited

U.S. PATENT DOCUMENTS

| 2005/0143845 | A1* | 6/2005 | Kaji ................................ 700/28 |
| 2008/0215512 | A1  | 9/2008 | Narzisi et al. |
| 2009/0192973 | A1* | 7/2009 | Kakehi et al. ................. 706/52 |

FOREIGN PATENT DOCUMENTS

| WO | WO 02/03716 A1    | 1/2002 |
| WO | WO 2009/063182 A1 | 5/2009 |

OTHER PUBLICATIONS

Deb K. et al., "Constrained Test Problems for Multi-objective Evolutionary Optimization", EMO 2001, LNCS 1993, pp. 284-298, 2001.*
Deb K., "Multi-objective Genetic Algorithms: Problem Difficulties and Construction of Test Problems", Technical Report No. CI-49/98, Oct. 1998, pp. 1-29.*
Deb K. et al., "A Fast and Elitist Multiobjective Genetic Algorithm: NSGA-II", IEEE Transactions on Evolutionary Computation, vol. 6, No. 2, Apr. 2002, pp. 182-197.*

(Continued)

*Primary Examiner* — Jeffrey A Gaffin
*Assistant Examiner* — Dave Misir
(74) *Attorney, Agent, or Firm* — Finch & Maloney PLLC

(57) ABSTRACT

A method of generating a set of solutions to a route-planning problem includes iteratively applying a Probability Collective (PC) method, each iteration including sampling from a probability distribution defined over a set of decision variables relating to a route-planning problem and using an archive set of decision variables and a set of the sampled decision variables to update the probability distribution for use in a subsequent PC method iteration. A set of solutions, each including at least one decision variable with an associated objective function result evaluated by the PC method iterations, is output.

12 Claims, 3 Drawing Sheets

(56) References Cited

OTHER PUBLICATIONS

Wolpert D. et al., "Probability Collectives in Optimization", SFI Working Paper: 2011-08-033, Jun. 25, 2011, pp. 1-47. (Date precludes use).*

Dubois D. et al., "Refinements of the maximin approach to decision-making in a fuzzy environment", Fuzzy Sets and Systems, 81, 1996, pp. 103-122.*

Kulkarni A. et al., "Probability Collectives: A mUlti-agent approach for solving combinatorial optimization problems", Applied Soft Computing, 10, Sep. 19, 2009, pp. 759-771.*

International Search Report (PCT/ISA/210) issued on Feb. 3, 2011, by the European Patent Office as the International Searching Authority for International Application No. PCT/GB2010/051847.

European Search Report issued on Sep. 7, 2010, for European Application No. 09275105.6.

Great Britain Search Report issued on Apr. 26, 2010 for Great Britain Application No. 0919343.4.

Dev Rajnarayan et al., Probability Collectives for Optimization of Computer Simulations, 48$^{th}$ AIAA/ASME/ASCE/AHS/ASC Structures, Structural Dynamics, and Materials Conference, Apr. 26, 2007, Honolulu, Hawaii, pp. 1-10.

David H Wolpert, Information Theory—The Bridge Connecting Bounded Rational Game Theory and Statistical Physics, Feb. 19, 2004, retrieved from internet.

Nicholas Jozefowiez et al., Parallel and Hybrid Models for Multi-objective Optimization: Application to the Vehicle Routing Problem, 7$^{th}$ International Conference Proceedings, Sep. 7-11, 2002, pp. 271-280.

Nicolas Jozefowiez et al., Multi-objective vehicle routing problems, European Journal of Operational Research 189, 2008, pp. 293-309.

Stefan R. Bieniawski et al., Flight Control with Distributed Effectors, American Institute of Aeronautics and Astronautics Inc., US, vol. 3, 2005, pp. 2301-2310.

David H. Wolpert et al., Distributed Control by Lagrangian Steepest Descent, 43$^{rd}$ IEEE Conference on Decision and Control, Dec. 14-17, 2004, Atlantis, Paradise Island, Bahamas, pp. 1562-1567.

Antony Waldock et al., Multi-Objective Probability Collectives, Applications of Evolutionary Computation, Springer Berlin Heidelberg, Berlin, Heidelberg, Apr. 7, 2010, pp. 461-470.

Anand J. Kulkarni et al., Probability Collectives for Decentralized, Distributed Optimization: A Collective Intelligence Approach, 2008 IEEE International Conference on Systems, Man and Cybernetics, pp. 1271-1275.

Notification Concerning Transmittal of International Preliminary Report on Patentability (Forms PCT/IB/326 and PCT/IB/373) and the Written Opinion of the International Searching Authority (Form PCT/ISA/237) dated May 18, 2012, issued in corresponding International Application No. PCT/GB2010/051847. (10 pages).

* cited by examiner

201. Initialise the archive set A to empty

202. Initialise $T$ to $T_{start}$ and calculate $T_{decay}$

203. Initialise the number of evaluations to 0

204. Initialise the set of MOPC Particles $P$

205. repeat

206.   for all MOPC Particles do

207.     Update MOPC Particle using $A$

208.     Increment the number of evaluations taken

209.   end for

210.   if $(T > T_{end})$ then

211.     Decrement $T$

212.   end if

213. until (evaluations > maximum evaluations)

214. Output the non-dominated set from archive set $A$

Fig. 2

301.  if first run then

302.   Draw and evaluate a set of samples $D$ from $X$ using a uniform distribution

303. else

304.   Draw and evaluate a set of samples $D$ from $X$ using distribution

305. end if

306.   Add the samples taken in $D$ to a local cache $L$

307.   Calculate the Maximin Fitness of the set $L \cup A$ (local cached samples and the global archive)

308.   Find the new $q_\theta$ by minimising the KL divergence (Eq.4)

309.   Add the samples from $D$ that are not dominated to the archive $A$.

Fig. 3

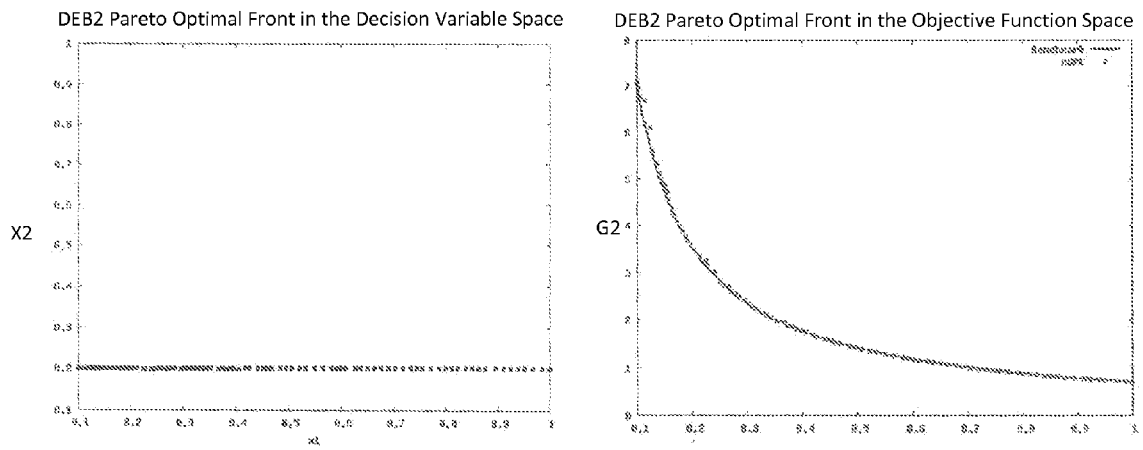

Fig. 4

GENERATING A SET OF SOLUTIONS TO A MULTI-OBJECTIVE PROBLEM

The present invention relates to generating a set of solutions to a multi-objective problem, such as a route-planning problem.

Traditionally, multi-objective optimisation problems, such as route-planning problems, have been solved using relatively undirected search techniques like Particle Swarm Optimisation and Genetic Algorithms. These optimisation techniques are applicable to a wide range of problems, but one disadvantage is that they have few guarantees and are based largely on heuristics.

Embodiments of the present invention are intended to address the problems outlined above.

According to one aspect of the present invention there is provided a method of generating a set of solutions to a route-finding problem, the method including:

iteratively applying a Probability Collective (PC) method, each iteration including sampling from a probability distribution defined over a set of decision variables relating to a route-planning problem and using an archive set of decision variables and a set of the sampled decision variables to update the probability distribution for use in a subsequent said PC method iteration, and outputting a set of solutions, each of the solutions including at least one said decision variable with an associated objective function result evaluated by the PC method iterations.

The archive set will typically include the decision variables with associated objective function results evaluated during at least one previous said PC method iteration. The archive set may comprise a Crowding Archive. The archive set may be intended to store a Pareto Optimal set of decision variables during performance of the method. At least one decision variable in the set identified may be used to generate a parametric distribution peaked over a set of non-dominated solutions for use in a subsequent said PC method iteration.

The identification of at least one decision variable in the set may include evaluating how dominated one decision variable in the set is in comparison with the decision variables in the archive set. A ranking algorithm, such as Maximin ranking algorithm, can be used to perform the evaluation. Although other ranking algorithms are available, such as MOEA/D where each of the parametric distributions evaluates a weighted single objective function.

A said PC method iteration may include:

drawing at least one sample from a distribution (e.g. parametric) of said decision variables;

evaluating an objective function for the at least one drawn sample;

adding the at least one sample and the associated objective function evaluation to the archive set;

evaluating how dominated the at least one drawn sample is in comparison with the decision variables in the archive set (e.g. using a Maximin algorithm);

generating a new (parametric) distribution over said decision variables for use in a subsequent said PC method iteration (e.g. using a Minimising KL Divergence), and deciding a value for a T variable for use in the subsequent PC method iteration.

The step of deciding a value for the T variable can comprise decaying a value of the T variable, or can comprise using cross-validation to determine an optimal value for the T variable.

According to another aspect of the present invention there is provided apparatus configured to generate a set of solutions to a route-planning problem, the apparatus including:

a device configured to iterative applying a Probability Collective (PC) method, each iteration including sampling from a probability distribution defined over a set of decision variables relating to a route-planning problem and using an archive set of decision variables and a set of the sampled decision variables to update the probability distribution for use in a subsequent said PC method iteration, and a device configured to output a set of solutions, each of the solutions including at least one said decision variable with an associated objective function result evaluated by the PC method iterations.

The apparatus may further include a device configured to use at least one generated solution to manoeuvre a vehicle in accordance with the solution.

According to yet another aspect of the present invention there is provided a computer program product comprising computer readable medium, having thereon computer program code means, when the program code is loaded, to make the computer execute a method substantially as described herein.

According to further aspects of the present invention there are provided methods of route-planning or decision making or solving a logistics task substantially as described herein.

According to a general aspect of the present invention there is provided a method of generating a set of solutions to a multi-objective problem, the method including:

iteratively applying a Probability Collective (PC) method, each iteration including sampling from a probability distribution defined over a set of decision variables relating to a multi-objective problem and using an archive set of decision variables and a set of the sampled decision variables to update the probability distribution for use in a subsequent said PC method iteration, and outputting set of a solutions, each of the solutions including at least one said decision variable with an associated objective function result evaluated by the PC method iterations.

Apparatus and computer program products for implementing these methods may also be provided. The multi-objective problem may comprise a route-planning problem, a decision-aid problem or the like.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which:

FIG. 2 illustrates schematically steps involved in an example route-planning method;

FIG. 3 illustrates further steps of the route-planning method;

FIG. 4 comprises graphs illustrating experimental results, and

Figure 5:
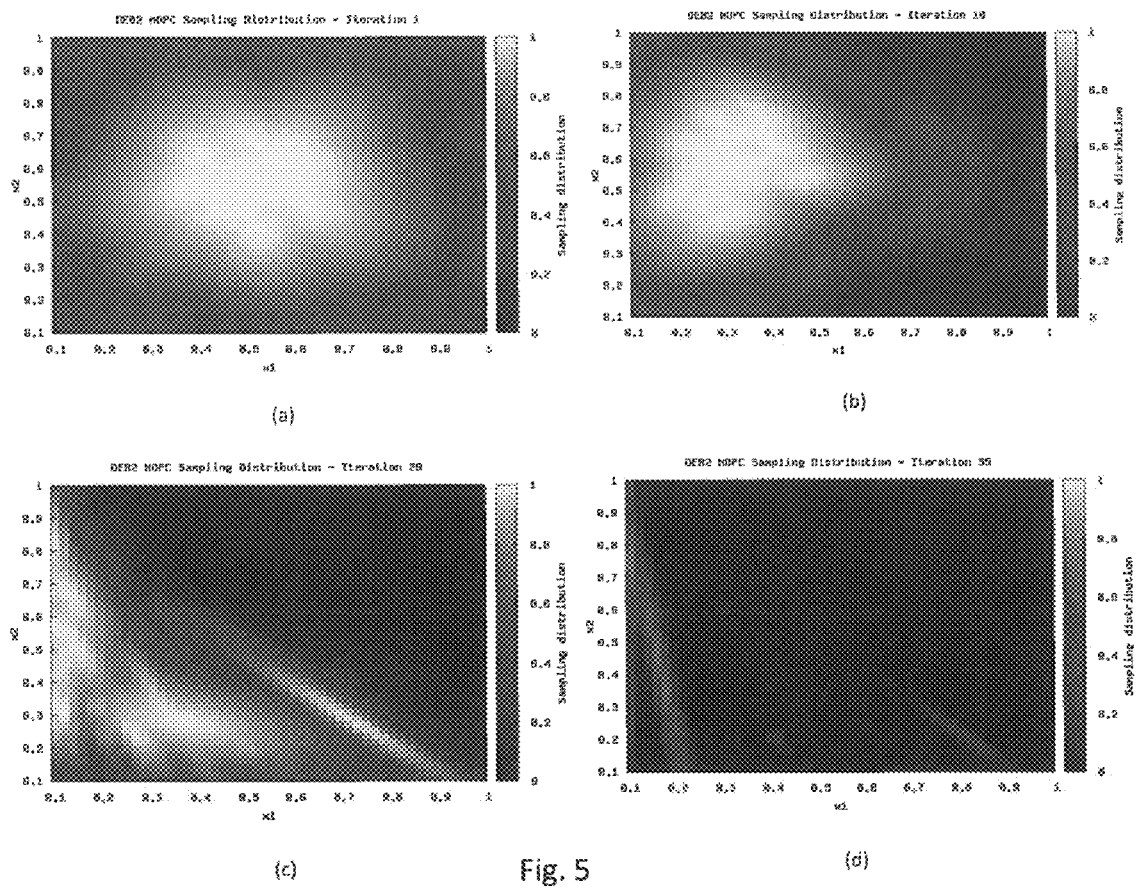

FIG. 5 comprises graphical representations of parametric distributions generated during an experiment.

Figure 1:
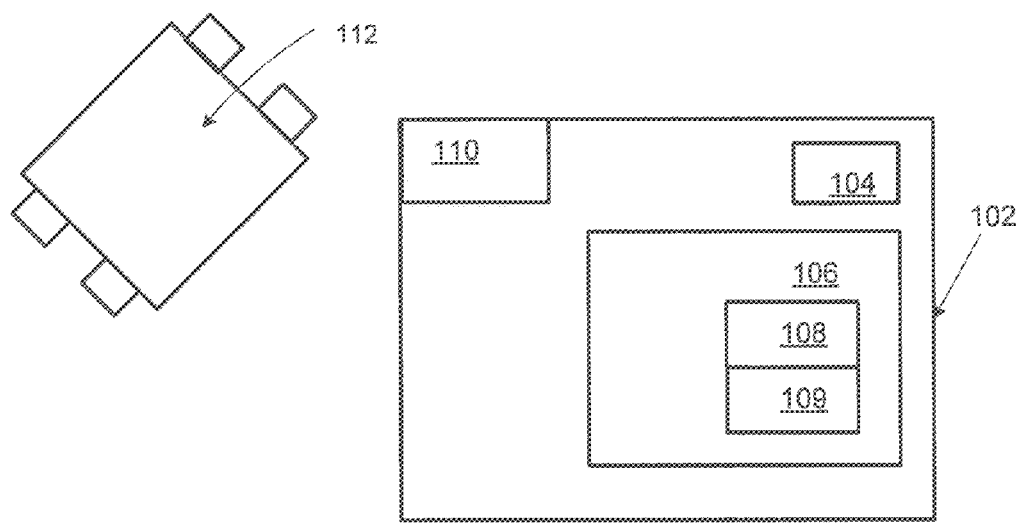
FIG. 1 illustrates schematically a vehicle and a computing device executing a route-planning application.

FIG. 1 shows a computing device 102 including a processor 104 and a memory 106. The memory includes code 108 that allows the computing device to perform route-planning applications, as well as data 109 generated/used by the application. The computing device further includes interfaces 110 that allow it to communicate with a user and, in the example, another computing device 111 located onboard a vehicle 112. The vehicle may be capable of traversing land, water and/or air.

The application 108 typically receives input describing a destination and produces output that can be used to direct the vehicle to the destination. The application 108 and the computing device 102 may produce visual output that can be used by a driver to manoeuvre the vehicle, but it will be understood that variations are possible. For instance, the computing device may be onboard the vehicle and/or the vehicle may be at least partially autonomous, with output from the application 108 being used to directly control the positioning/heading of the vehicle.

The route-planning application 108 operates using a technique developed by the present inventors, who investigated the application of Parametric Learning (PL) and Monte Carlo Optimisation (MCO) techniques in the form of Probability Collectives (PC) to multi-objective optimisation problems. The resulting embodiments are intended to solve a multi-objective optimisation, such as the route-planning problem, which is defined by the set of objective functions that need to be minimised (or maximised). In the route-planning problem the inputs may comprise a set of changes in vehicle heading and the objective function may be defined in terms such as distance, cost and/or safety, for example. The general multi-objective problem can be formally defined by Equation 1:

$$\operatorname*{argmin}_{x \in X} G_m(x) \quad (1)$$

where $G_m(x)$ is an objective function and x is defined a vector of decision variables (or a solution) in the form $x=(x_1, x_2 \ldots, x_N)$ from the set of solutions X. Each decision variable $x_n$ is bounded between an upper and lower bound as defined by the objective function under investigation.

A usual aim in multi-objective optimisation is to find the Pareto Optimal set which contains all solutions, or at least one/some of the solutions, that are not dominated by any other solution. A solution $x_1$ is said to be dominated by solution $x_2$, if and only if, $x_1$ is as good as $x_2$ in all objectives and $x_1$ is strictly better than $x_2$ in at least one objective.

Probability Collectives (PC) is a set of techniques that can be used for black-box optimisation that have deep theoretical connections to game theory, statistical physics and optimisation. PC has been applied to single objective problems, but the present inventors are unaware of PC having been applied to multi-objective problems.

Typically, an optimisation problem is soled by manipulating a vector of decision variables x, in a deterministic or stochastic fashion (e.g., Simulated Annealing), until an objective function (G(x)) over those decision variables is minimised. An important difference within PC is that the optimisation process is performed on probability distributions q(x) over those decision variables rather than the decision variables directly. Once the optimisation has been performed, the optimal decision variables x can be found by sampling from the distribution q(x). The PC optimisation process seeks to induce a distribution that is highly peaked around the value of the decisions variables that minimise the objective function. This approach has been shown to have the following advantages:

1. it permits a distributed approach, in the sense that the distribution over each decision variable can be updated independently of one another
2. it can be applied in the same general way regardless of whether the variables are continuous, discrete, time-extended, mixtures, etc
3. it is robust, in the sense that the objective function can be irregular or noisy
4. it provides sensitivity information about the objective function, in the sense that a decision variable with a peaky distribution is more important than a decision variable with a broad distribution PC includes a range of different approaches to black-box optimisation based on Monte Carlo Optimisation (MCO). In PC, the optimisation problem can be formally defined by Equation 2:

$$\operatorname*{argmin}_{q\theta \in \mathcal{Q}} \mathbb{E}_{q\theta}(G(x)) \quad (2)$$

where $q_\theta$ is a parametric distribution defined over the decision variables x in the set of all possible distributions $\mathcal{Q}$ which minimise the expectation $\mathcal{E}_{q\theta}(G(x))$. By considering the expectation of all possible distribution, $\mathcal{E}_{\mathcal{Q}}(G(x))$, one solution is the point-wise limit of the Boltzmann distributions shown in Equation 3:

$$p^*(x) = \lim_{\beta \to \infty} p^\beta(x) \quad (3)$$

where $p^\beta(x)$ is defined as $\exp[-\beta G(x)]$. Therefore, as $\beta$ tends towards ∞ the distributions of $p^\beta$ become peaked around the solutions (x) that minimise G(x). To be able to find $p^*(x)$, a parametrised distribution is used to approximate the Boltzmann distributions. A parametric distribution $g_\theta$ is "fitted" to the Boltzmann distribution $p^\beta$ by minimsing the Kullback-Leibler (KL) divergence in Equation 4:

$$\mathbb{E}_{q\theta}(G(x)) = -KL(p^\beta \| q\theta) \quad (4)$$

$$= -\int p^\beta \ln\left(\frac{p^\beta}{q\theta}\right) dx \quad (5)$$

By minimising the KL Divergence, the parametric disbribution $q_\theta$ will approximate the "target" Boltzmann distribution of $p\beta(x)$. In a similar approach to simulated annealing, the parameter $\beta$ is used as a regularization parameter that controls the evolution of the parametric distribution towards areas of the decision space that minimise the objective function.

The high-level PC optimisation algorithm outlined above can be represented by the following pseudo-code:

1. Initialise $\beta$ to be $\beta_{min}$
2. Initialise the number of evaluations to 0
3. repeat
4.   if first run then -continued 5. Draw a set D from X using a uniform distribution
6. else
7.  Draw a set D from X using $q_\theta$
8. end if
9.  Evaluate G(x) for each sample drawn
10. Find $q_\theta$ by minimising the KL Divergence
11. Update β
12. Update evaluations
13. until (evaluations > maximum evaluations)

Here, the minimisation of KL divergence is formulated as a cross-entropy minimisation problem using a single multivariate Gaussian density function with mean μ and convariance σ. The following equations define how μ and σ are found:

$$\mu^* = \frac{\sum_D s^i x^i}{\sum_D s^i} \quad (6)$$

$$\sigma^* = \frac{\sum_D s^i (x^i - \mu^*)(x^i - \mu^*)^T}{\sum_D s^i} \quad (7)$$

where $s^i$ is defined as $p(x^i)$ and $x^i$ is the $i^{th}$ sample in the sample set D. As mentioned above, $p(x^i)$ is defined using a Boltzmann distribution $\exp[-\beta G(x^i)]$. The parametric representation of the distribution can be also be a mixture of Gaussians or any other kernel (Neural Network kernel).

The present inventors have appreciated that elements within the algorithm can be considered to have a similarity with the Expectation Maximisation (EM) algorithm. A difference between these approaches is the inclusion of the $s^i$ term which is driven by β included the Boltzmann distribution. From a different perspective, the β term acts as a trade-off during the optimisation process. When β is small, the parametric distribution found attempts to fit only the distribution of the samples, regardless of the objective function G(x). Whilst as β tends toward infinity the parametric distribution found focuses largely on the samples with the lowest G(x) by producing a highly peaked distribution around them.

The present inventors have extended the PC optimisation algorithm discussed above to include multiple objective functions. Embodiments of such extended algorithms are referred to herein as "Multi-Objective Probability Collectives" (MOPC) and these can be implemented using a similar fitness function to that for Particle Swarm Optimisation or MOEA/D. Pseudo-code representing an example of the MOPC optimisation method is shown in FIG. 2.

In the example MOPC method, the term β is replaced by T, wherein β is defined as 1/T. Firstly, the MOPC algorithm initialises (step 201) an archive A to store the Pareto Optimal set during the optimisation process. The archive used in the example is a Crowding Archive (see Deb, K, Pratap A, Agarwal, S, Meyarivan, T: A fast elitist multi-objective genetic algorithm: NSGAII, IEEE Transactions on Evolutionary Computation 6, 182-197 (2000)), but other archives could be used, with the MOPC algorithm remaining substantially unchanged. Next, the MOPC algorithm initialises (step 202) the regularisation parameter T and also a counter (step 203) for the number of evaluations made. The example MOPC method calculates the decay rate used for T based on $T_{start}$, $T_{end}$, the maximum number of evaluations allowed E, the number of particles [P] (initialised at step 204) and the number of samples on each iteration [D].

$$T_{decay} = \sqrt[\frac{|P|*|D|}{E}]{\frac{T_{end}}{T_{start}}}. \quad (8)$$

The MOPC method then repeatedly updates each of the particles' parametric distribution while reducing T (steps 205-212) until (step 213) the maximum number of evaluations have been reached and, by definition, $T_{end}$ has been reached. The output of the MOPC method can include the population of solutions contained in the archive A. An example of how to update the individual MOPC particles (as in step 207) is shown in the pseudo-code of FIG. 3.

Each of the MOPC particles performs a PC optimisation to find a parametric distribution peaked over the set of non-dominated solutions that will improve the archive A. On the first run (steps 301-302), samples are firstly drawn from a uniform distribution. If it is not the first run then the samples are drawn from the parametric distribution $q_\theta$ (steps 303-304). The newly generated samples D are then added at step 306 to the local cache L. The samples from the local cache D and the global archive A are then evaluated at step 307 using the Maximin fitness function which is detailed in Equation 9 below; however, it will be appreciated that another ranking algorithm, e.g. PAES or MOEA/D where individual MOPC particles target weighted single objective functions could be used:

$$f_{maximin}(x) = \max_{j=1,2...\ |D|; x \neq x^j} \left( \min_{m=1,...,M} (G_i(x) - G_i(x^j)) \right) \quad (9)$$

where m is the objective function, $x^j$ is the $j^{th}$ sample in the set and $f^{maximin}$ (x) is the fitness value for the sample x.

The Maximin fitness function returns a fitness value which determines how dominated x is over the rest of the samples. When the Maximin fitness function is less than zero then x is non-dominated, samples with a fitness of zero are weakly-dominated and samples with a fitness greater than zero are dominated. Hence, the parametric distribution is driven towards samples that are non-dominated. The samples are then used, at step 308, with the associated T to minimise the KL divergence in order to find the parametric distribution $g_\theta$. Then, the samples from D that are non-dominated (i.e. have a fitness less or equal to zero) are added to the archive (step 309). The overall process drives each of the MOPC particles to areas of the decision space that will improve the archive A and in the end a position on the Pareto optimal front.

The output of the MOPC method comprises the set of solutions in the archive A, or more of which can be used for route-planning applications, e.g. displayed to a vehicle driver or operator who can select/implement one of them. The probability distributions related to the solutions in the archive are also available. It will be understood that the steps of the example described above are exemplary only and some of the steps can be omitted and/or re-ordered in alternative embodiments.

One problem used to demonstrate the performance of MOPC is the DEB2 problem (as defined in Deb, K: Multi-objective genetic algorithms: Problem difficulties and construction of test problems, Evolutionary Computation 7, 205-

230 (1999)). A set of CEC 2009 problems are also used for rigorous comparison. The DEB2 problem is defined by the following equations:

$$\text{minimise } G_1(x_1, x_2) = x1 \quad (10)$$

$$\text{minimise } G_2(x_1, x_2) = \frac{g(x_2)}{x_1} \quad (11)$$

Where $g(x_2) =$ $$2.0 - \exp\left(-\left(\frac{x_2 - 0.2}{0.004}\right)^2\right) - 0.8 \exp\left(-\left(\frac{x_2 - 0.6}{0.4}\right)^2\right)$$

and $x_1$ and $x_2$ are defined in the range [0.1, 1.0].

The DEB2 problem is a two dimensional problem and hence suitable for visualisation. The DEB2 problem also contains a local minimum around $x_2 \approx 0.6$ and the true maximum around $x_2 \approx 0.2$ which provides a useful comparison of the characteristics of the MOPC method against other known methods. In the experiments performed, all the algorithms used 35000 evaluations and the performance was calculated over 50 independent runs. The MOPC algorithm had an archive size |A| of 100, a sample size |D| of 100, a cache size |L| of 100, $T_{start}$ was 1.0 and $T_{end}$ was 0.001. NSGAII, MOEA/D and SMPSO implementations where taken from the known jMetal framework. The parameters used for NSGAII where a population size of 100, mutation rate of 0.5, crossover rate of 0.9, distribution index of 20 and a selection operator of BinaryTournament2. The parameters used for MOEA/D were a population size of 100, mutation rate of 0.5, distribution index of 20, crossover rate of 0.1 and F of 0.5. The parameters for SMPSO were a population size of 100, 350 iterations, archive size of 100 and a perturbation rate of 0.5.

The preliminary results of applying MOPC to the DEB2 problem compared to NSGAII, MOEA/D and SMPSO are shown in the table below, which presents the Hypervolume, Spread, IGD and EPSILON performance measures of the three algorithms:

| Performance Measure | MOPC | MOEA/D | NSGAII | SMPSO |
| --- | --- | --- | --- | --- |
| HV | 0.79922 | 0.69100 | 0.73389 | 0.80283 |
|  | (0.00341) | (0.09760) | (0.09590) | (0.00005) |
| SPREAD | 0.47353 | 0.85128 | 0.52470 | 0.22155 |
|  | (0.13098) | (0.13950) | (0.05548) | (0.01345) |
| IGD | 0.01973 | 0.16504 | 0.10037 | 0.01333 |
|  | (0.00775) | (0.11234) | (0.11756) | (0.00014) |
| EPSILON | 0.03078 | 0.18848 | 0.12513 | 0.00874 |
|  | (0.02409) | (0.14719) | (0.14885) | (0.00042) |

Thus, the table shows that MOPC archives better performance on all the performance measures than NSGAII and MOEA/D. MOPC and SMPSO repeatedly achieve a HV score close to the maximum achievable (0.8053) with a low standard deviation. The IGD score also shows this consistently good performance with a mean score ten times better than MOEA/D and NSGAII abut partial worse than SMPSO. The uniformity of the Pareto Optimal set produced is also shown in the SPREAD measure, where the smaller the score the better the uniformity of the spread. The measure shows that the uniformity of the results is significantly better than MOEA/D but worse than SMPSO. Although the Maximin Fitness Function used encodes a form of "crowding" metric, distribution of MOPC particles has not been optimised in this implementation to provide a uniform spread. The Pareto Optimal set for both the decision and objective function space, produced by MOPC on a single run, are shown in FIG. 4. The graphs in the Figure show that the Pareto Optimal set is aligned to the optimal set in the Objective Function space, which lies in a very small region in the decision variable space. The way in which the MOPC method discovers this region can be observed through closer inspection of the parametric distribution during the optimisation process.

FIG. 5 shows the evolution of the parametric distribution after 1, 10, 20 and 35 (the final) iterations. The results show that the parametric distribution is initialised in the centre of the decision space, from 10 to 20 iterations the distribution slides to the left and down in the input space where a local minima (of weakly non-dominated solutions) is present. As the optimisation progresses, the parametric distribution focuses where $x_2$ is approximately 0.2 and along the entire length of $x_1$, which corresponds to the Pareto Optimal set for this problem, as well as the weakly non-dominated solutions where $x_1$ is 0. These results show that using a PC approach can be used to find the Pareto Optimal front in the DEB2 multi-objective problem.

The experimental results of applying MOPC and the other methods (SMPSO, MSGAII and MOEA/D) used in the previous section to the first four of the CEC 2009 problems are outlined below:

| CEC Problem | MOPC | MOEA/D | NSGAII | SMPSO |
| --- | --- | --- | --- | --- |
| UF1 | 0.79922 | 0.69100 | 0.73389 | 0.80283 |
|  | (0.00341) | (0.09760) | (0.09590) | (0.00005) |
| UF2 | 0.47353 | 0.85128 | 0.52470 | 0.22155 |
|  | (0.13098) | (0.13950) | (0.05548) | (0.01345) |
| UF3 | 0.01973 | 0.16504 | 0.10037 | 0.01333 |
|  | (0.00775) | (0.11234) | (0.11756) | (0.00014) |
| UF4 | 0.03078 | 0.18848 | 0.12513 | 0.00874 |
|  | (0.02409) | (0.14719) | (0.14885) | (0.00042) |

It is possible to use multiple MOPC optimisers to formulate the problem as a particle swarm style optimisation. Also, the parametric distribution is represented by a single multi-variant Gaussian in the above embodiment and this can be insufficient for high-dimensional or complex problems. Hence, the parametric representation may be extended to a more complex representation in order to allow a greater diversity of distributions to be modelled.

Although the example described above relates to a route-planning problem, it will be appreciated that the MOPC method described herein can be adapted for use in other applications involving a multi-objective problem, such as mission planning or decision aids. The MOPC method could also be applied to a logistics task where an optimal set of ordered tasks is required.

The invention claimed is:

1. A method of generating a set of solutions to a multi-objective route-planning problem, the method including:
    iteratively applying a Probability Collective (PC) method to the multi-objective route planning problem, each iteration including sampling from a probability distribution defined over a set of decision variables relating to a route-planning problem and using an archive set of decision variables and a set of the sampled decision variables to update the probability distribution for use in a subsequent one of said PC method iterations;
    outputting a set of solutions to the multi-objective route planning problem, each of the solutions including at least one said decision variable with an associated objective function result evaluated by the PC method iterations; and controlling a vehicle according to at least a portion of the set of solutions.

2. A method according to claim 1, wherein the archive set includes the decision variables with associated objective function results evaluated during at least one previous said PC method iteration.

3. A method according to claim 1, wherein the archive set comprises a Crowding Archive.

4. A method according to claim 1, wherein the at least one decision variable in each of the solutions of the output set is used to generate a parametric distribution peaked over a set of non-dominated solutions for use in a subsequent one of said PC method iterations.

5. A method according to claim 1, wherein an identification of at least one decision variable in the set of decision variables includes evaluating how dominated the at least one decision variable in the set is in comparison with the decision variables in the archive set.

6. A method according to claim 5, wherein a Maximin ranking algorithm is used for the evaluation.

7. A method according to claim 1, wherein a PC method iteration includes:
drawing at least one sample from a parametric distribution of said decision variables; evaluating an objective function for the at least one drawn sample; adding the at least one drawn sample and the associated objective function evaluation to the archive set;
evaluating how dominated the at least one drawn sample is in comparison with the decision variables in the archive set;
generating a new parametric distribution of said decision variables for use in a subsequent PC method iterations; and
deciding a value for a T variable for use in a subsequent one of said PC method iterations.

8. A method according to claim 7, wherein the generating of a new parametric distribution involves a KL Divergence minimisation technique.

9. A method according to claim 7, wherein the deciding of a value for the T variable comprises: decaying the T variable, or using cross-validation to determine an optimal value for the T variable.

10. A computer program product comprising non-transitory computer readable medium, having thereon computer program code means, when the program code is loaded, to make the computer execute a method according to claim 1.

11. Apparatus configured to generate a set of solutions to a multi-objective route-planning problem, the apparatus including:
a device configured to iteratively apply a Probability Collective (PC) method to the multi-objective route planning problem, each iteration including sampling from a probability distribution defined over a set of decision variables relating to a route-planning problem and using an archive set of decision variables and a set of the sampled decision variables to update the probability distribution for use in a subsequent one of said PC method iterations, and
a device configured to output a set of solutions to the multi-objective route planning problem, each of the solutions including at least one said decision variable with an associated objective function result evaluated by the PC method iterations.

12. Apparatus according to claim 11, including, a device configured to use at least one generated solution to maneuver a vehicle in accordance with a said solution.

* * * * *